United States Patent [19]

Mogul

[11] Patent Number: 5,014,221
[45] Date of Patent: May 7, 1991

[54] MECHANISM FOR ARBITRATING CLIENT ACCESS TO A NETWORKED PRINT SERVER

[75] Inventor: Jeffrey C. Mogul, Palo Alto, Calif.

[73] Assignee: Digital Equipment Corporation, Maynard, Mass.

[21] Appl. No.: 149,420

[22] Filed: Jan. 29, 1988

[51] Int. Cl.⁵ .............................................. G06F 3/12
[52] U.S. Cl. .................................... 364/519; 364/900
[58] Field of Search ... 364/200 MS File, 900 MS File, 364/518–520

[56] References Cited

U.S. PATENT DOCUMENTS

| | | | |
|---|---|---|---|
| 3,593,300 | 7/1971 | Driscoll et al. | 364/200 |
| 3,614,745 | 10/1971 | Podvin et al. | 364/200 |
| 4,273,041 | 6/1981 | Boleavage et al. | 364/900 X |
| 4,466,065 | 8/1984 | Advani et al. | 364/300 |
| 4,536,874 | 8/1985 | Stoffel et al. | 370/85 |
| 4,556,959 | 12/1985 | Allen et al. | 364/900 |
| 4,633,245 | 12/1986 | Blount et al. | 340/825.83 X |
| 4,658,351 | 4/1987 | Teng | 364/200 |

Primary Examiner—David L. Clark
Attorney, Agent, or Firm—Arnold, White & Durkee

[57] ABSTRACT

In response to a print request, a print server returns a "window" message which specifies an amount of data that the process is permitted to send to the print server. The amount of data can be zero, indicating that the printer is not available. In this case the print server queues the print request, and when the printer becomes available to service the queued request, the queued request is removed from the queue and a "window" message indicating that the printer is available is sent to the requesting device. In response, the requesting device transmits a packet of data to be printed including the amount of data specified by the window message, and the requesting device waits for an acknowledgement of the print data packet. When the printer finishes printing the data, the print server acknowledges receipt of the data packet, and repeats the window message. This procedure is repeated until the printer has printed all of the data that the requesting device would like to have printed. Then, the requesting device terminates the connection by sending a termination request, which the print server acknowledges. Finally, the requesting device returns the acknowledgement.

11 Claims, 6 Drawing Sheets

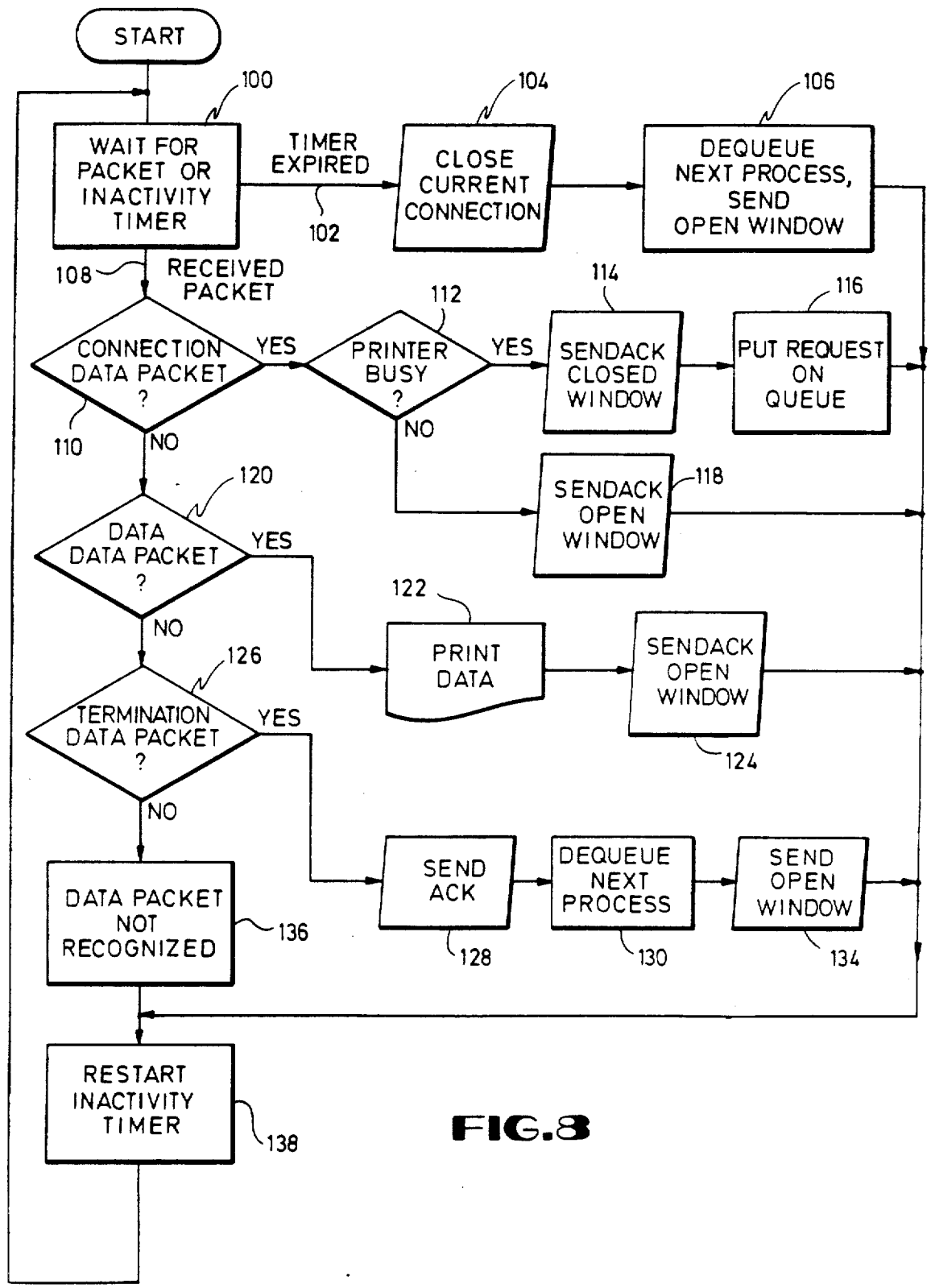

«5,014,221»

MECHANISM FOR ARBITRATING CLIENT ACCESS TO A NETWORKED PRINT SERVER

BACKGROUND OF THE INVENTION

1. Technical Field

This invention relates to local area networks, and more particularly to improvements in method and apparatus for a print server for networked printers. Specifically, this invention relates to a method and apparatus for arbitrating client access to a network print server.

2. Background Art

Local Area Networks (LAN), and Wide Area Networks (WAN) originally were used for communications among computer devices (such as terminals, personal computers, and minicomputers) As network usage increased, it was found that the various devices on the network could share resources. For example, a printer connected to a computer could be used by other computers on the network, simply by sending the data to be printed to the printer's computer. As long as the printer's computer had memory resources to handle the large amounts of print data generated by the devices on the network, this system worked adequately. However, dedicating the printer's computer to work as a network print server slows or sometimes even halts other uses of the printer's computer. Therefore, a stand-alone printer that will serve as a network printer has been proposed.

A network printer, like other devices on the network, must have the ability to communicate. Therefore, the network printer must have a certain amount of processing power and memory, so that it may follow the same communications protocol as the rest of the devices on the LAN as well as print. However, the more complex the processor, and the more amount of memory required, the more expensive the network printer becomes.

A network printer without a large memory or a nonvolitile memory (such as a disk) has several problems not shared by other devices on the network. A printer is slow, especially in comparison to the time it takes to transmit data. The printer cannot print data as fast as the client can send it, and therefore needs to store the data it receives. However, it is also common to have several megabytes of data to be printed. A printer that has limited memory resources may not be able to handle all of the data that a client device will send, and will therefore lose data.

Furthermore, while the printer is printing for one client device, other client devices might also want to print requests to be serviced. The printer's client processes do not coordinate print requests among themselves because it would take too much time and network resources for each client to check with every other client on the network before sending print requests to the printer. However, because the printer can only service one request at a time (otherwise the printer output would be meaningless), it has to have some method of turning down requests. Answering every request may interrupt the printing process and slow the printer even further. As the clients receive denials of their requests, they will set a timer and try again. The time interval between retries will vary with the client. In a busy network in which clients set unreasonably and unfairly short retry intervals, the printer will have to handle more requests, thus making the printing process even slower.

SUMMARY OF THE INVENTION

In accordance with the present invention, the foregoing objectives are realized by providing a system using virtual circuits and "windows" for communication between client processes on a network and a print server in a network printer. Furthermore, the printer server queues requests for later service when the printer is busy and receives a print request.

The print session begins when a client process establishes a connection with the print server by sending a request for connection. The print server sends an acknowledgment back to the client to complete the connection. The acknowledgment includes a "window" message which specifies an amount of data that the process is permitted to send to the print server. The size can be zero, meaning the "window" is closed (the printer is not available, send no data) or positive, meaning the window is open (the printer is available, send an amount of data up to the size of the open window).

If the printer is busy when the connection is requested, it will complete the connection by sending the requesting process an acknowledgement including a "closed window" message. The print server queues the requesting process, and dequeues it when the printer is available.

If the printer is available when the connection is requested, the printer will send an "open window" message, specifying a window size equal to the available memory in the printer. This prevents the client from sending more data than the printer can handle and thus prevents the printer from losing data.

When the window is open, the process requesting the printer sends up to one window worth of data to the print server. The process requesting the printer waits for an acknowledgment of the receipt of the data packet. When the printer has printed some of the data, the print server acknowledges the receipt of the data packet, and repeats the open window message. This procedure continues until the client has sent all of the data to be printed. The client then terminates the connection by sending a termination message. The print server acknowledges the termination message, ending the print session.

When the print server is finished printing one request, it dequeues another request. This can be performed using a FIFO queue, or client priority. When the print server determines the next client to service, it sends an open window message to that client and proceeds as above.

BRIEF DESCRIPTION OF THE DRAWINGS

FIG. 8 is a flowchart of a high-level control procedure executed by the print server for acknowledging and servicing a print request from a remote interface in a client device.

DETAILED DESCRIPTION OF THE PREFERRED EMBODIMENT

While the invention will be described in connection with certain preferred embodiments, it will be understood that it is not intended to limit the invention to those particular embodiments. On the contrary, it is intended to cover all alternatives, modifications and equivalent arrangements as may be included within the scope of the invention as defined by the appended claims.

Local Area Network

Figure 1:
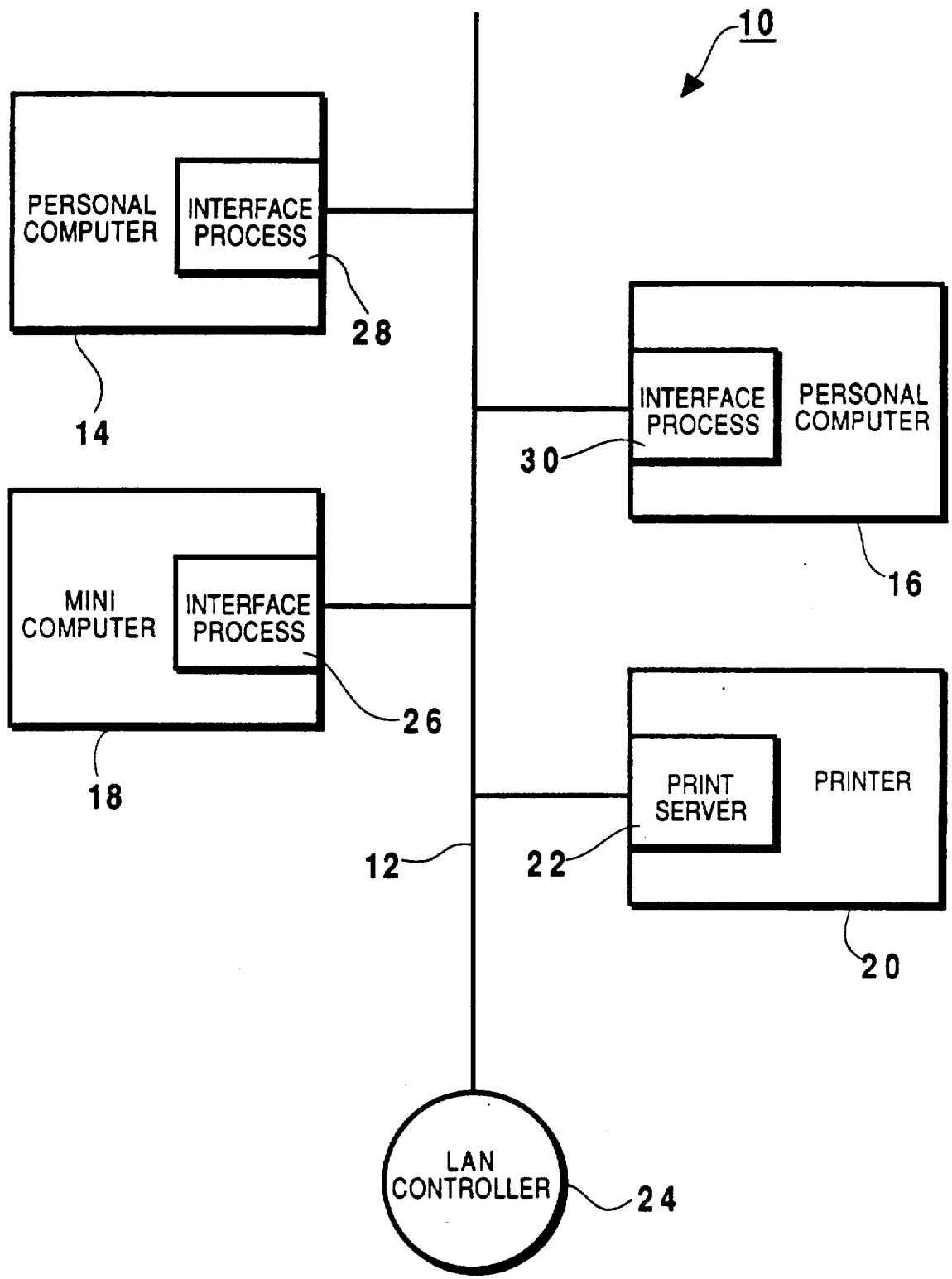
FIG. 1 is a schematic diagram showing a typical LAN configuration including several computer devices and a network printer.

Referring now to FIG. 1, a Local Area Network (LAN) 10 includes a bus 12, two personal computers 14 and 16, a minicomputer 18 and a network printer 20. The LAN is managed by a LAN controller 24. This is a typical configuration of a LAN and illustrates the advantages of such an arrangement, i.e., an expensive device such as a network printer can be made more economical by sharing such a device among multiple users. In the illustrated system, the users of all the networked computer resources, such as the personal computers 14 and 16 and the minicomputer 18, will have access to the printer. Furthermore, the personal computers 14 and 16 can have access to the greater memory capacity of the minicomputer 18.

In order to share resources, the devices on the LAN must be able to communicate with each other. For this purpose each device has an interface that sends and receives data. In the example of FIG. 1, the networked personal computers 14 and 16, the minicomputer 18 and the printer 20, each has its own interface 28, 30, 26 and 22, respectively. The interfaces send and receive data on the LAN according to the LAN protocol. While this invention is described in connection with a LAN in the preferred embodiment, it can also be used in a wide area network.

Internet Protocol

A LAN protocol organizes both the flow of data packets on the LAN and the format of the data in the data packets. By following a protocol, all devices on the LAN can communicate with each other in an orderly, comprehensible manner. The well known Internet Protocol (IP) will be described for use in the preferred embodiment, but it will be understood that other LAN protocols can be utilized in the present invention. IP is described in J. Postel (ed.), "Internet Protocol— DARPA Internet Program Protocol Specification", RFC 791, USC/Information Sciences Institute, September 1981, which is incorporated herein by reference.

Figure 2:
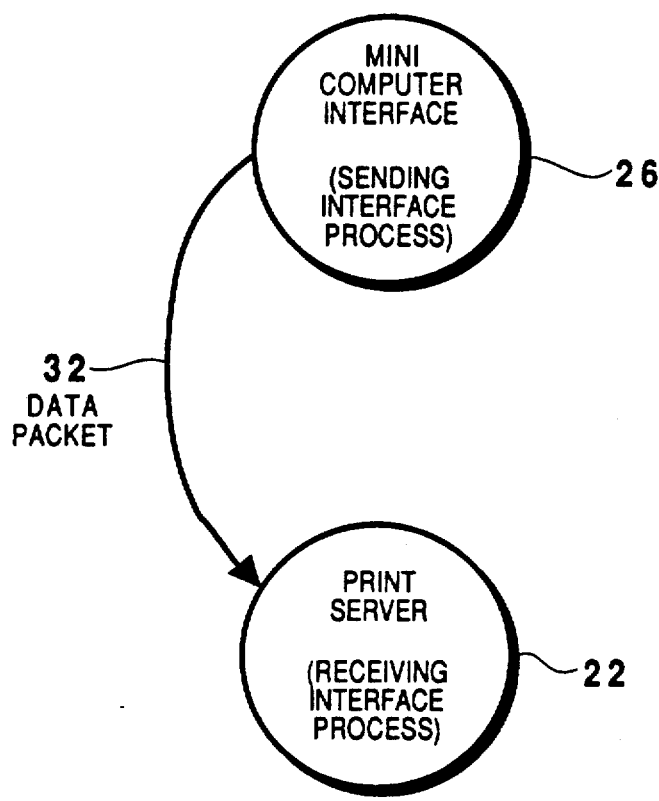
FIG. 2 is a schematic diagram showing data transfer according to Internetwork Protocol.

FIG. 2 shows an IP data transaction between the minicomputer 18 and the printer 20. The IP data transaction is a one-way communication. The interface 26 of the minicomputer 18 transmits a data packet 32 on the bus 12. The data packet is received by the print server 22 of the printer 20. The minicomputer interface 26 performs a "sending interface process" and the print server 22 performs a "receiving interface process". In IP, there is no verification of the data packet, error checking, or, more importantly, acknowledgement by the print server 22 to the minicomputer interface 26 that the data packet is received.

Furthermore, if the amount of data to be sent by the minicomputer interface 26 requires more than one data packet, IP cannot guarantee that the data packets will be received in the proper order. Since there is no acknowledgment by the print server 22, the minicomputer interface 26 cannot detect whether the previous data packet was received before sending the next data packet. Therefore, IP is a simple protocol that works in LAN's which do not require multiple data packets or high system reliability.

Using IP by itself, processes wishing to print could flood the print server with data packets. Data packets could be delivered to the print server out of order, or the print server may receive more data packets than it can process at one time. The print server would then require additional processing and memory capacity to straighten out the data packets, or else it would require a large amount of memory or non-volatile storage means such as a disc.

Transmission Control Protocol

The preferred embodiment of this invention uses Transmission Control Protocol (TCP) as a layer on IP to help insure the reliability of data transmission. TCP uses IP data packets to send data on the LAN, but creates a reliable, flow-controlled mechanism out of the unreliable, uncontrolled IP mechanism. TCP is described in detail in J. Postel (ed.) "Transmission Control Protocol—DARPA Internet Program Protocol Specification," RFC 793, USC/Information Sciences Institute, September, 1981, which is incorporated herein by reference.

Figure 3:
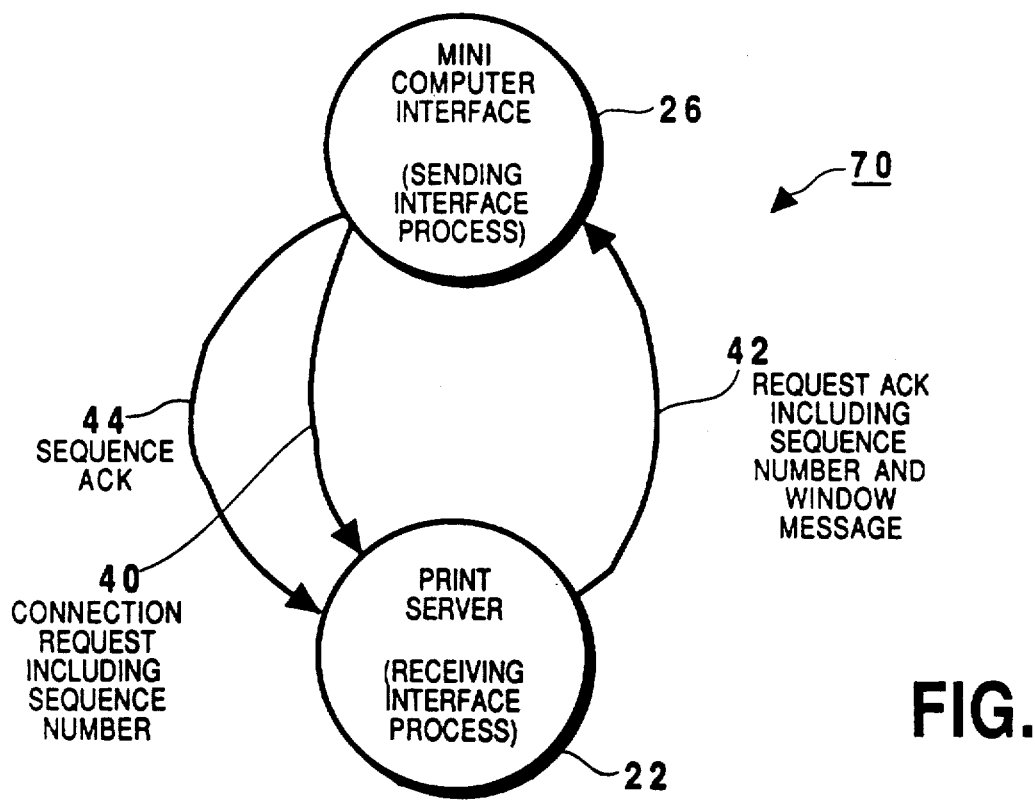
FIG. 3 is a schematic diagram of a virtual circuit connection set-up, according to Transmission Control Protocol.

In order to insure data packet delivery, TCP establishes a virtual circuit before data containing data packets are exchanged. FIG. 3 shows the connection protocol under TCP. When the minicomputer interface 26 has data to print, it first sends a connection request data packet 40 to the print server 22. The connection request data packet includes the sequence number of the first data packet it will send containing data to be printed. If the print server accepts the connection, it sends a request acknowledgment data packet 42 to the minicomputer interface 26. The request acknowledgment data packet 42 acknowledges the first sequence number, and includes the print server's own first sequence number and a "window" message. Sequence numbers and window messages are described below. The minicomputer interface 26 then sends a sequence acknowledgment 44 acknowledging the print server's sequence number. At this point the connection is established; both the minicomputer interface and the print server are synchronized and prepared to send and receive data.

Figure 4:
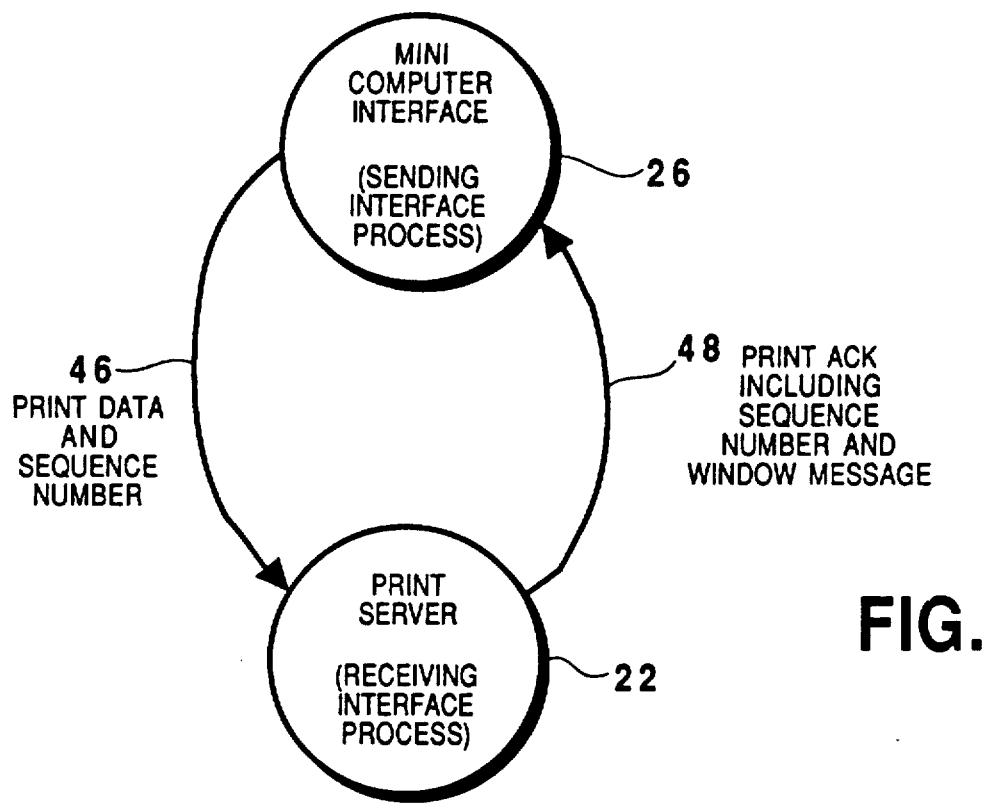
FIG. 4 is a schematic diagram showing data transfer according to Transmission Control Protocol.

Sequence numbers control the flow of data under TCP. The minicomputer interface 26 usually cannot send all of the data to be printed in one data packet. It therefore divides the print data into manageable segments and sends each segment in an individual data packet. FIG. 4 shows the flow of data after a connection has been established. The minicomputer interface 26 sends the data to be printed and a sequence number in a print data packet 46. The print server 22 checks the sequence number to confirm that this print data data packet 46 is in proper sequence. The print server 22 then sends a print acknowledgment data packet 48. The print acknowledgement data packet 48 includes the next sequence number that the print server is expecting and the next window size it can accommodate.

The "window" message informs the minicomputer interface 26 how much data the print server 22 can accommodate. When the print server 22 has limited memory, windows prevent the minicomputer interface 26 from sending more data than the print server 30 can store. Otherwise, data that the minicomputer interface 26 wants to be printed would be lost.

The minicomputer interface 26 sets a timer when it sends a print data data packet 46. It must receive the print acknowledgment data packet 48 within a reasonable time, or it will assume that the data packet 46 was lost. The minicomputer interface 26 sends the print data data packet 46 again if the timer times out before the acknowledgment data packet 48 is received. A "reasonable time" is the approximate time the LAN takes for a round trip message, which could be from a few milliseconds to several seconds. A timer no shorter than one second is recommended in J. Postel (ed.) "Transmission Control Protocol-DARPA Internet Program Protocol Specification," RFC 793, USC/Information Sciences Institute, September, 1981, p. 41.

When the print server 22 sends a closed window data packet 48 to the minicomputer interface 26, TCP provides a "zero-window probe". The minicomputer interface 26 is waiting for a data packet with an open window 48. The minicomputer interface 26 sets a timer defining a preselected interval, i.e., two minutes. At the expiration of the timer, the minicomputer interface 26 sends one byte of data in a data packet 46 to the print server 22. The print server 22 will send an acknowledgement data packet 48 with either an open or closed window. The minicomputer interface 26 can thus be assured that it will discover when the print server 22 is ready to open the window.

The data transfer stage, FIG. 4, continues until the interface 26 has no more data to send to the print server 22.

Figure 5:
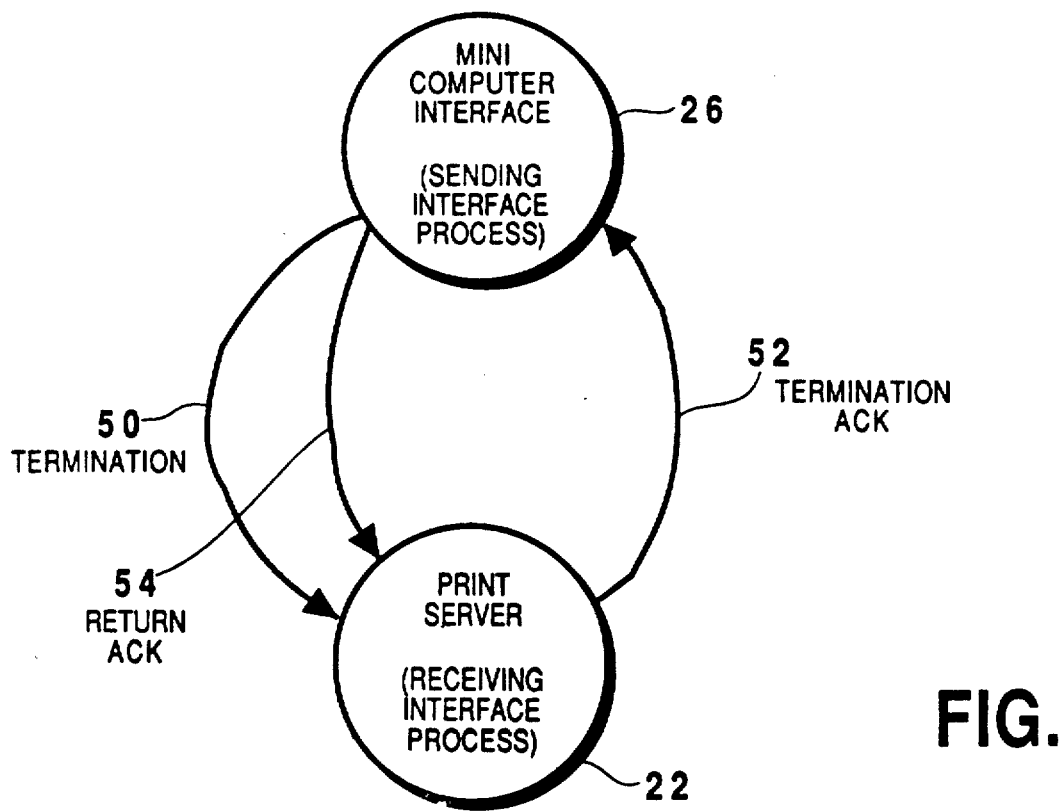
FIG. 5 is a schematic diagram of a virtual circuit termination according to Transmission Control Protocol.

FIG. 5 shows the termination sequence. The minicomputer interface 26 initiates the termination of the virtual circuit, by sending a termination data packet 50 to the print server 22, which responds by sending a termination acknowledgment data packet 52. The minicomputer interface 26 then sends a return acknowledgment 54 of the termination acknowledgment 52, thus ending the virtual circuit.

The print server can only service one print request at a time. If it receives a second connection request, it must interrupt the printing process and respond to the request. If it did not respond to the request, the process requesting the printer would not know whether the printer was busy or inoperative. The interface would then attempt to establish a connection at a later time. With several interfaces contending for the printer in this manner, the first interface to attempt a connection when the printer becomes idle will get the connection. The interface that has been waiting the longest will not necessarily be the next one served. There is an incentive for interfaces to retry connections as quickly as possible, thus slowing down the printing process further, and wasting network and print server resources. On a slow network, such as a WAN, the extra load could be significant. As will be described below, the present invention avoids these problems.

Queuing Requests

Figure 6:
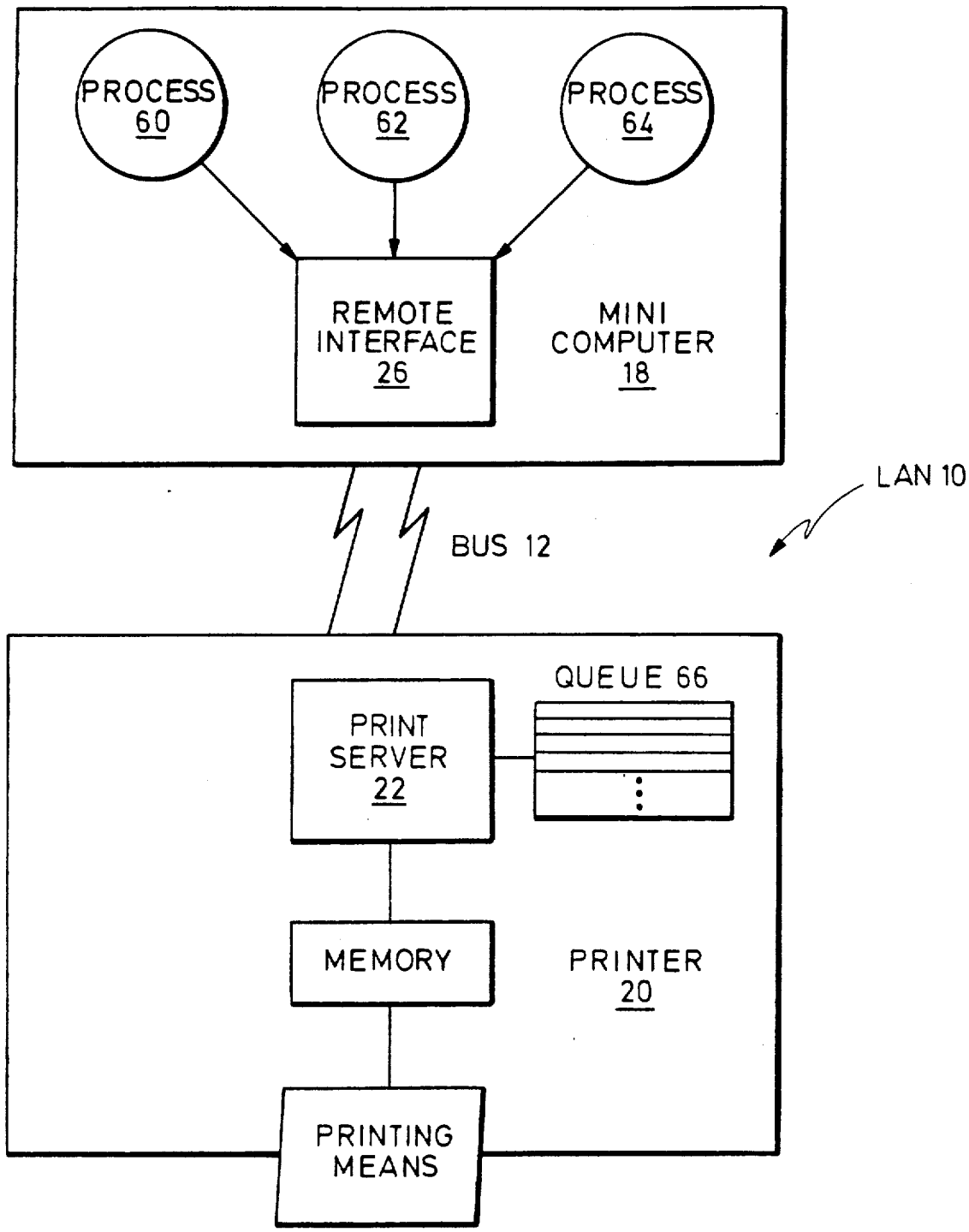
FIG. 6 is a block diagram of a preferred embodiment of this invention, where a LAN remote interface in a minicomputer is communicating with a print server in a network printer.

Referring to FIG. 6, which is a more detailed illustration of a portion of a LAN 10, it can be seen that there are several processes 60, 62, 64 performed by the minicomputer 18. When any of these processes need to have data printed, that process gives the data to be printed to the minicomputer interface 26, which sends a TCP connection request to the print server 22.

When the print server 22 receives a connection request, it determines whether or not the printer 20 is busy. If the printer is not busy, it establishes the connection and opens a window as described in above in connection with FIG. 3.

If the printer 20 is printing, the print server 22 places a respective interface identifier for the minicomputer interface 26 on a service queue 66. The print server then formats and sends a TCP connection message, as described above. In this case the print server sends back a closed window message, asking the minicomputer interface 26 not to send any data after establishing the connection.

After the minicomputer interface 26 receives the request acknowledgment, it looks at the window message. If the window message is a positive integer (window open), the minicomputer interface completes the connection by sending a sequence acknowledgement, and sends the data to the printer. The amount of print data sent equals the "size" specified by the window message, or possibly a lesser amount.

Once the print server 22 terminates a connection with one minicomputer interface 26, it dequeues the next interface identifier on the service queue 66 and sends an open window message to it. The preferred dequeuing algorithm is first-in, first-out, but priority schemes based on the interface identifier or algorithms based on how recently and/or frequently an interface has been serviced can also be used to control the dequeuing.

Data Flow In The Interface Process

Figure 7:
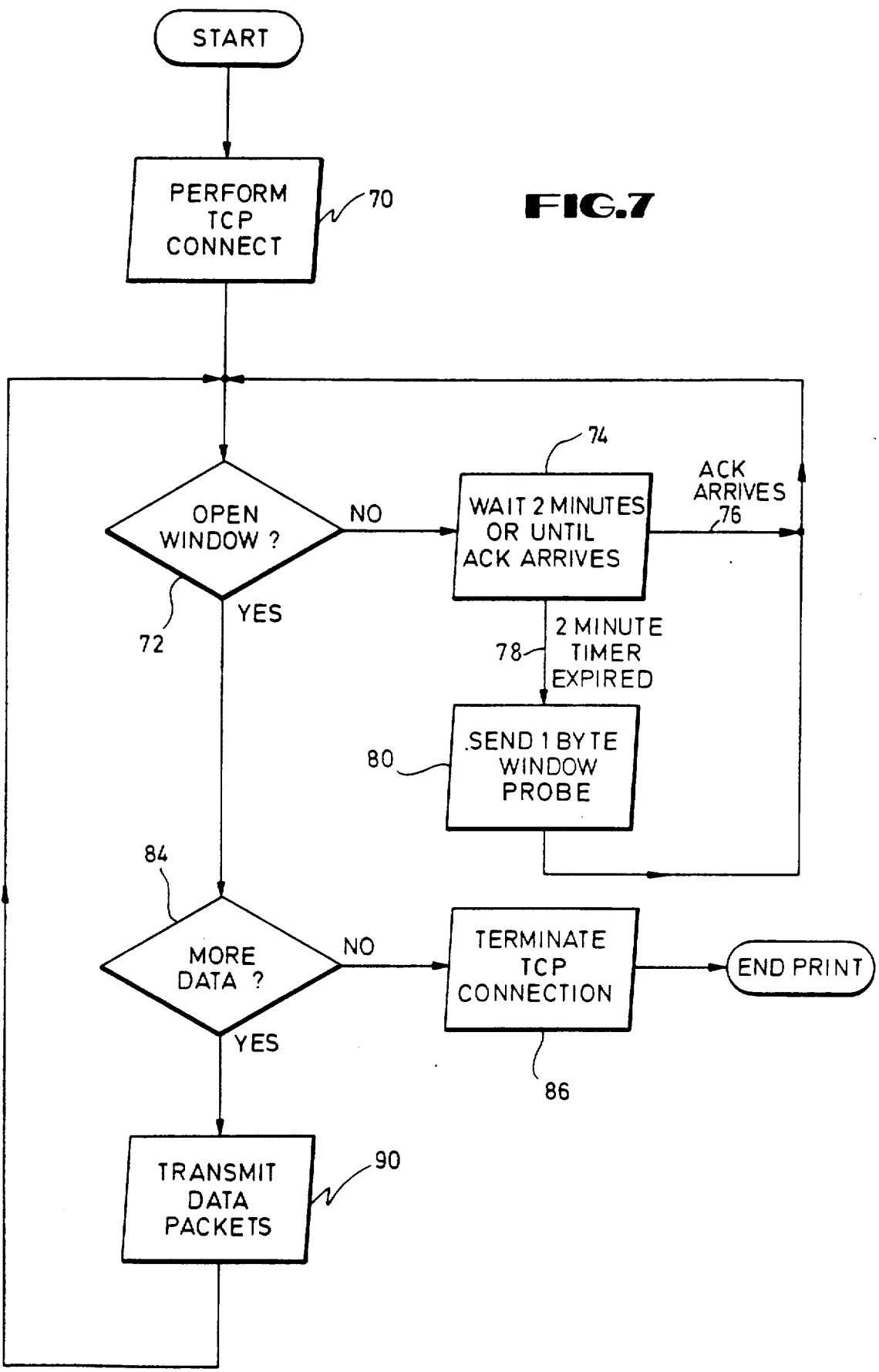
FIG. 7 is a flowchart of a high-level control procedure executed by the remote interface for issuing and monitoring a print request to the print server.

FIG. 7 shows a flowchart of a high-level control procedure performed by the interface 26 to print data received from a high-level process performed by the minicomputer 18 (e.g., process 60, 62 or 64 in FIG. 6). In the first step 70, the TCP connection is made, as shown in FIG. 3. The interface receives the request acknowledgement data packet from the print server, and in step 72 the interface checks to see if the window is open. If the window is not open, the process waits for the open window message and performs the timing function in step 74, as noted above in connection with FIG. 4. The timing function in step 74 terminates either when an acknowledgement arrives 76, which contains a new window, or when the timer expires 78. When the timer expires in step 80 the interface probes the window, as described above in connection with FIG. 4. After sending the window probe an acknowledgement data packet will be received. Therefore, the procedure branches back to step 72, where it checks to see if the window is open.

When the interface does receive the open window message, in step 84 a transmit data buffer is checked, and if data is available for transmission, in step 90 the interface transmits a print data packet according to the data transfer protocol described in FIG. 4. The procedure branches back to step 72 to check the acknowledgement for an open window. When the transmit data buffer is found to be empty in step 84, the interface terminates the TCP connection in step 86 according to the termination protocol described in FIG. 5.

Data Flow In The Print Server

A flowchart of a high-level control procedure regulating the data flow in the print server 22 is shown in FIG. 8. In step 100, the print server is waiting for either an inactivity timer to expire or to receive a data packet. The inactivity timer is described in relation to step 138, below. If the timer expires, control path 102 is taken from step 100. In step 104 the current TCP connection is closed according to TCP as described in FIG. 5 above. In step 106 the print server dequeues the next interface identifier from the service queue and sends the open window data packet to that interface.

If the print server receives a data packet in step 100, control path 108 is selected. In step 110 a check is made to see if the data packet is a connection request data packet. If it is a connection request data packet, a check is made in step 112 to see if the printer is busy. If the printer is busy, in step 114 a request acknowledgement data packet with a closed window message is sent to the remote interface, and in step 116 the respective interface identifier for the remote interface requesting is put on the service queue. If in step 112 the printer is not found to be busy, in step 118 a request acknowledgement with an open window message is sent to the requesting interface in step 120.

In step 120, the data packet is checked to see if it contains data to be printed. If so, in step 134 the print server prints the data and then in step 136 sends a print acknowledgement with an open window message.

While the printer is printing data in step 122, the print server is still able to receive data packets in step 100. Programming a process to do this is old in the art and is not shown here for the sake of clarity. A particularly simple method is to program the control procedure of FIG. 8 as a software interrupt routine. Therefore, if the control procedure of FIG. 8 does not finish processing for a current data packet when the next data packet is received due to the fact that print data from the current data packet is being printed in step 122, the printing will be momentarily interrupted to process the next data packet. In this regard, it should be recognized that in step 120, a print data packet should be recognized only if it is the print data packet from the interface currently being serviced (e.g., it must have the proper sequence number), and only if the procedure of FIG. 8 is not already performing a print data task (e.g. there cannot be an interrupted printing procedure on the interrupt stack).

In step 126, the received data packet is checked to see if it is a termination data packet. In step 128, the print server then terminates the connection according to TCP, described in FIG. 5 above. In step 130 the print server then dequeues the next interface identifier from the service queue and in step 134 sends an open window message to the identified interface. In step 136, if the data package packet is not recognized by the print server, the print server can simply ignore the data packet. Other possibilities for unknown data packets would be to send the date packet back on the LAN or return the data packet to the sender.

In step 138 the inactivity timer is restarted, by setting the inactivity timer to a predetermined value. The timer value in the print server should be less than the timer value of FIG. 7, 74. The print server is a limited resource and cannot be tied up by an inactive interface. An interface could become inactive for one of two reasons: the computer on which the interface resides could become inoperative, or the interface process itself could become inoperative in such a way that the TCP connection remains but no data is sent. In either case the symptom seen by the print server will be a lack of incoming data packets from the currently connected interface. Therefore, every time the print server finishes processing a data packet it restarts an inactivity timer in step 138, and branches back to step 100.

It is possible that this method can be applied to other services having similar characteristics: a network-accessed server without non-volatile storage, multiple clients that do not coordinate their requests and a service that must be serialized and that takes a fairly long time to complete. Such services include archiving of files to tape and archive retrieval, access to batched communication channels such as UUCP, and control of mechanical devices such as automated warehouse systems.

I claim:

1. A printer having printing means for printing data, memory means for storing data before the data is printed, and a print server for communicating with a local area network having at least one remote device for performing processes remote from the print server communicating by way of data packets, said remote device having (1) sending means for sending data packets to other processes on the local area network, said data packets including print request data packets for indicating to the print server when said remote processes have data to be printed, and (2) means for receiving data packets from other processes on the local area network. said print server comprising the combination of:
   (a) print request receiving means for receiving said print request data packets from said remote device;
   (b) determining means responsive to the reception of said print request data packets by said print request receiving means for determining the amount of said memory means available for data to be printed;
   (c) print request acknowledgment means responsive to the determination of available memory by said determining means, said print request acknowledgement means including means for (i) sending a connection-open return data packet to the requesting remote process for establishing a logical connection between the requesting remote process and the print server if there is available memory, said connection-open return data packet including data representing the amount of available memory, (ii) sending a connection-open return data packet to the requesting remote process and queuing the print request if there is no available memory, said connection-open return data packet including data representing zero available memory and, (iii) dequeuing the print request and sending a return data packet to the requesting remote process when memory becomes available.

2. The printer of claim 1 wherein said remote device includes means for causing the remote process to wait until said receiving means receives said return data packet indicating available memory, and causing the remote process to send the data to be printed to said print server.

3. The printer of claim 1 wherein said print requests are dequeued on a first in, first out basis.

4. The printer of claim 1 wherein said print requests are dequeued on a priority basis.

5. The printer of claim 1 wherein the remote process and the print server communicate using Internet Protocol.

6. The printer of claim 1 wherein the remote processes and the print server communicate using Transmission Control Protocol.

7. A method of operating a printer having (i) printing means for printing data, (ii) memory means for storing data before the data is printed, and (iii) a print server for communicating with a local area network having a plurality of devices for performing processes remote from the print server communicating by way of data packets, each of said remote devices having
   (1) sending means for sending data packets to other processes on the local area network said data packets conforming to a protocol that permits sending of a print-request series of one or more data packets for indicating to the print server that one of said remote processes has data to be printed, and
   (2) receiving means for receiving data packets from other processes on the local area network, said method comprising the steps of:
   (a) said print server receiving a said print-request series of data packets from a requesting remote process;
   (b) next determining the "available memory" equal to the amount of said memory means available for data to be printed;
   (c) sending a return data packet to the requesting remote process to establish a logical connection between the print server and the requesting remote process, said return data packet including data representing the amount of available memory, said requesting remote process responding to the data representing the available memory in said return data packet by waiting if there is no memory available, or by sending data, if there is memory available to be printed; and
   (d) said print server (i) queuing the print request if there is no available memory, and (ii) dequeuing the print request and sending a return data packet to the requesting remote process when memory becomes available.

8. The method of claim 7 wherein (i) the remote process waits until receiving a return data packet indicating available memory when there is no available printer memory means; (ii) the remote process sends the data to be printed to said print server when there is available printer memory means.

9. A method of servicing a service request sent to a data processing device from one of a plurality of remote devices,
   said devices being linked by a common data link and each of said devices having means for transmitting and receiving data packets over said common data link,
   said data processing device having a certain amount of memory for storing data to be processed,
   said method comprising the steps of:
   (a) said data processing device receiving a service request data packet from a requesting one of said remote devices;
   (b) next said data processing device determining whether said certain amount of memory is available for receiving data to be processed;
   (c) sending a return data packet to the requesting remote device establishing a logical connection between said data processing device and the requesting remote process, said return data packet including data indicating whether said certain amount of memory is available for receiving data to be processed;
   (d) said data processing device queuing an identification of said requesting remote device when said certain amount of memory is not available; and
   (e) when said certain amount of memory later becomes available, dequeuing said identification and sending a return data packet indicating memory availability to the identified requesting remote device.

10. The method as claimed in claim 9, further comprising the steps of operating said requesting remote device to receive a return data packet; and to respond to the data indicating whether said certain amount of memory is available by transmitting to said data processing device a data packet including said certain amount of data in the event that said certain amount of memory is indicated as available for receiving data to be processed, and otherwise waiting for receipt of another return data packet from said data processing device and thereafter transmitting to said data processing device a data packet including said certain amount of data.

11. The method as claimed in claim 10, wherein said step of waiting for receipt of another return data packet includes the steps of said requesting remote device:
   (i) waiting for a predetermined amount of time, and
   (ii) retransmitting a service request to said data processing device in the event that another return data packet was not received after waiting for said predetermined amount of time.

* * * * *

UNITED STATES PATENT AND TRADEMARK OFFICE
CERTIFICATE OF CORRECTION

PATENT NO. : 5,014,221
DATED : May 7, 1991
INVENTOR(S) : Jeffrey C. Mogul

It is certified that error appears in the above-identified patent and that said Letters Patent is hereby corrected as shown below:

IN THE CLAIMS:

In claim 1, line 33, column 8, after the number "(2)", add -- receiving --.

Signed and Sealed this

Fifteenth Day of September, 1992

*Attest:*

DOUGLAS B. COMER

*Attesting Officer*  Acting Commissioner of Patents and Trademarks